(12) United States Patent
Vitalini (10) Patent No.: US 10,435,250 B2
(45) Date of Patent: Oct. 8, 2019

(54) TRANSVERSE CONVEYORS

(71) Applicant: SIEMENS AKTIENGESELLSCHAFT, Munich (DE)

(72) Inventor: Michele Vitalini, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/291,599

(22) Filed: Mar. 4, 2019

(65) Prior Publication Data

US 2019/0270596 A1 Sep. 5, 2019

(30) Foreign Application Priority Data

Mar. 2, 2018 (EP) .................................... 18159622

(51) Int. Cl.
| | |
|---|---|
| *B65G 39/12* | (2006.01) |
| *B65G 13/11* | (2006.01) |
| *B65G 47/22* | (2006.01) |
| *B65G 13/02* | (2006.01) |

(52) U.S. Cl.
CPC .............. *B65G 39/12* (2013.01); *B65G 13/11* (2013.01); *B65G 47/22* (2013.01); *B65G 13/02* (2013.01)

(58) Field of Classification Search
CPC ......... B65G 13/11; B65G 39/12; B65G 47/22
USPC .............. 193/35 R, 35 SS, 35 MD; 198/779, 198/781.04
See application file for complete search history.

(56) References Cited

U.S. PATENT DOCUMENTS

| | | | | |
|---|---|---|---|---|
| 3,176,828 | A | * | 4/1965 | Sullivan ............... B65G 47/261 193/35 C |
| 3,420,356 | A | * | 1/1969 | De Good ............. B65G 47/261 198/781.01 |
| 3,958,684 | A | * | 5/1976 | Garzelloni ........... B65G 47/261 198/782 |

(Continued)

FOREIGN PATENT DOCUMENTS

| | | |
|---|---|---|
| JP | 2001072218 A | 3/2001 |
| JP | 2012171761 A | 9/2012 |

(Continued)

*Primary Examiner* — Douglas A Hess
(74) *Attorney, Agent, or Firm* — Laurence Greenberg; Werner Stemer; Ralph Locher (57) ABSTRACT

An inclined conveyor section includes transport rollers aligned obliquely on the conveyor section defining a preferred transport direction. The conveyor section is configured to receive parcel or piece goods upstream at a first position on a first side, transport them along the preferred transport direction and discharge them from a second side opposite the first side, downstream at a second position downstream of the first position. The transport rollers are one behind the other and rotatable. Drive rollers are controllable, drivable and disposed below the transport rollers for driving the transport rollers by frictional. A high degree of flexibility in the configuration of the transport rollers and independence of length, width and inclination angle defined by the preferred transport direction are provided in contrast to most existing inclined conveyors with transport rollers having only slight flexibility and/or complicated drives. A method for transporting parcel goods is also provided.

15 Claims, 5 Drawing Sheets

(56) References Cited

U.S. PATENT DOCUMENTS

| | | | | |
|---|---|---|---|---|
| 4,103,769 A * | 8/1978 | Jorgensen | B65G 47/261 | 198/781.04 |
| 4,362,238 A * | 12/1982 | Rivette | B65G 47/263 | 198/781.1 |
| 4,901,845 A * | 2/1990 | Zorgiebel | B65G 13/071 | 198/780 |
| 5,588,523 A * | 12/1996 | Hara | B65G 47/263 | 198/781.08 |
| 5,921,374 A * | 7/1999 | Takino | B65G 47/54 | 193/35 MD |
| 6,968,941 B2 * | 11/2005 | Fourney | B65G 17/08 | 198/370.03 |
| 7,040,478 B2 * | 5/2006 | Ehlert | B65G 13/10 | 198/369.4 |
| 7,249,669 B2 * | 7/2007 | Fourney | B65G 17/24 | 198/370.09 |
| 7,344,018 B2 * | 3/2008 | Costanzo | B65G 17/24 | 198/779 |
| 7,360,641 B1 * | 4/2008 | Fourney | B65G 17/24 | 198/779 |
| 7,506,751 B2 * | 3/2009 | Fourney | B65G 17/24 | 198/370.09 |
| 7,533,766 B1 * | 5/2009 | Fourney | B65G 17/24 | 198/370.09 |
| 7,866,460 B2 * | 1/2011 | Hentschel | B05B 14/00 | 198/781.08 |
| 7,971,701 B2 * | 7/2011 | Fourney | B65G 17/24 | 198/370.01 |
| 8,167,118 B2 * | 5/2012 | Fourney | B65G 17/24 | 198/779 |
| 8,196,736 B2 * | 6/2012 | Wagner | B65G 13/04 | 198/457.02 |
| 9,079,717 B1 * | 7/2015 | Costanzo | B65G 17/24 | |

FOREIGN PATENT DOCUMENTS

| | | |
|---|---|---|
| WO | 2017134278 A1 | 8/2017 |
| WO | 2017200019 A1 | 11/2017 |

* cited by examiner

TRANSVERSE CONVEYORS

BACKGROUND OF THE INVENTION

Field of the Invention

The present invention concerns the technical field of conveyor systems for the transport of parcel goods, in particular conveyor systems that comprise transport rollers and permit the directional conveying of parcel goods.

A conventional component in conveyor technology is a driven roller conveyor. This component is implemented in various ways: straight, with obliquely positioned transport rollers, as a herringbone or as a curve. Different drive technologies are used depending on the implementation: drive is transmitted between transport rollers by means of O-rings or toothed belts, or by belts or chains pressed against the transport rollers from below.

In the case of roller conveyors that are driven in this way, all transport rollers always have the same speed along the entire conveyor length. In addition, transmission and rotation problems occur on the transport rollers. Especially in the case of transport rollers arranged obliquely to a straight-line transport direction, the transmission of movement is complicated and sometimes it is difficult to transfer to transport rollers at the beginning and end of a conveyor section, so that combined techniques must be used. If only one central drive is used for the entire roller conveyor, the torque is transmitted from transport roller to transport roller, for example via belts or O-rings. This requires cost-intensive custom-made products. If the belt pressed against the transport rollers from below and the transport rollers driven by this belt have the same arrangement of conveyance directions, the space available is limited, and the transport rollers do not extend across the entire width of the conveyor system. A straight closure at the beginning and end of the roller conveyor is required. The width of the roller conveyor is limited because there is a close correlation between the angle of inclination and the width and length.

There are also other solutions, high flexibility may be achieved with ball roller conveyors with individual drives, for example, but these solutions are technically complicated in design, maintenance and operation.

BRIEF SUMMARY OF THE INVENTION

The objective of the present invention is accordingly to provide an improved conveyor system, particularly for inclined conveyors. This objective is achieved by the solutions described in the independent claims.

The solution according to the invention provides for a conveyor system for transporting parcel goods, comprising an inclined conveyor section. The inclined conveyor section has a first side and a second side, with the first and second sides facing each other. The inclined conveyor section has a preferred transport direction comprising a longitudinal component along the sides and a transverse component from the first side to the second side. The inclined conveyor section is configured to receive the parcel goods upstream at a first position on the first side, transport them along the preferred transport direction and discharge them downstream from the second side at a second position that is arranged downstream of the first position. The inclined conveyor section comprises transport rollers and drive rollers. The transport rollers are arranged one behind the other and rotatably mounted. The drive rollers may be controlled and driven and are arranged below the transport rollers so that the transport rollers may be driven by the drive rollers via frictional contact. The transport rollers are aligned obliquely on the inclined conveyor section so that the preferred transport direction of the inclined conveyor section coincides with a preferred transport direction of the transport rollers.

That the preferred transport direction of the inclined conveyor section matches a preferred transport direction of the transport rollers means that the axis of rotation of the transport roller is arranged orthogonal to the preferred direction.

The "longitudinal component of the preferred transport direction" refers to a straight transport direction of the conveyor section along the sides.

The drive rollers may be pressed, individually and independently of tolerances, against the transport rollers. In addition, drive rollers are typically cheaper than comparable driven transport rollers with comparable torque.

"Parcel goods" refers in particular to parcels, small packages and postal items, as well as pieces of luggage, but other commissionable goods may fall under this term as well. The application domain is therefore in particular a postal conveyor system or an airport baggage conveyor system.

The solution according to the invention may be further improved by various configurations that are respectively advantageous in themselves and, unless otherwise specified, may be combined freely. These configurations and the advantages they bring are discussed below.

The drive rollers may be configured so that they may be individually controlled and driven so as to separate, accelerate and/or decelerate parcel goods while they are simultaneously being transported sideways. In this way, a functional combination of the inclined conveyor section may be achieved, and as a result, it is possible to dispense with additional components of the conveyor system (separation apparatus, acceleration sections) that would otherwise be necessary.

In order to enable even greater individuality of the drive rollers and thus even better possibilities for manipulation of the parcel goods during transport, each drive roller may have its own drive.

According to one embodiment, the drive may be configured as a roller motor.

According to another embodiment, the drive rollers may be configured to be shorter than the transport rollers in relation to a length of their axes of rotation. As a result, the drive rollers may be installed in a very flexible and space-saving manner.

In order to make possible a particularly efficient drive, the diameter of the drive rollers may be larger and/or smaller than and/or equal to that of the transport rollers. The larger diameter reduces the required drive torque compared to a drive arranged in the transport rollers. The factor X between these two diameters requires that drive torque be reduced by the same factor X, compared to a drive in the transport rollers. Drive rollers with smaller diameters, on the other hand, may be pressed particularly thoroughly into a gap between two transport rollers. Drive rollers of the same diameter as the transport rollers are a good compromise between optimized drive torque and the size of the drive rollers.

According to another embodiment, the drive rollers may be arranged one behind the other and/or offset along the inclined conveyor section. This means that each drive roller may be positioned and freely adjusted anywhere along the inclined conveyor section, providing considerable flexibility in both the possible arrangement of the transport rollers and the possible specific configuration and/or arrangement of the transport rollers. In this way, even transport rollers that are difficult to reach may be driven.

To keep the number of drive rollers low and thus save costs, a drive roller may be arranged so that it is in frictional contact with two transport rollers. This may be achieved by pressing one drive roller into the gap below the two transport rollers and against the transport rollers.

According to another embodiment, the conveyor system may also comprise a control unit configured for controlling the drive rollers individually.

To make possible a conveyor section of large width, the inclined conveyor section may be covered by transport rollers over substantially the entire length and width of the section. This signifies that the transport rollers (of equal and/or different lengths) extend substantially continuously from the first to the second side and from the first to the second position and that the transport rollers thus cover the inclined conveyor section substantially continuously. The length of the transport rollers decreases towards the beginning and end of the inclined conveyor section. Thus configured, the inclined conveyor section has few interfering contours and less risk of a parcel good falling down at the sides of the inclined conveyor section, compared to inclined conveyor sections of the prior art. In addition, the inclined conveyor section is particularly suitable for wide parcel goods.

From the standpoint of a method, the above objective is achieved by a method for transporting parcel goods on an inclined conveyor section of a conveyor system. The inclined conveyor section has a first side and a second side, with the first and second sides facing each other. The inclined conveyor section has a preferred transport direction comprising a longitudinal component along the sides and a transverse component from the first side to the second side. The inclined conveyor section comprises transport rollers and drive rollers. The transport rollers are arranged one behind the other and rotatably mounted. The drive rollers may be controlled and driven and are arranged below the transport rollers so that the transport rollers may be driven by the drive rollers via frictional contact. And the transport rollers are aligned obliquely on the inclined conveyor section so that the preferred transport direction of the inclined conveyor section coincides with a preferred transport direction of the transport rollers. The method comprises the steps of receiving a parcel good upstream at a first position of the inclined conveyor section on the first side, transporting the parcel good along the inclined conveyor section in the preferred transport direction and discharging the parcel good downstream from the second side at a second position of the inclined conveyor section, arranged downstream of the first position.

According to one embodiment, the drive rollers may be individually controlled and driven at different speeds.

According to another embodiment, two transport rollers may be driven by driving one drive roller, for example by one drive roller being in frictional contact with two transport rollers.

According to another embodiment, the drive rollers may be arranged one behind the other and/or offset along the inclined conveyor section.

According to another embodiment, the parcel good may be transported in a freely selectable transport direction before being received by the inclined conveyor section, and after the parcel good has been discharged from the inclined conveyor section, the parcel good may be transported in a freely selectable transport direction.

DESCRIPTION OF THE INVENTION

Figure 1:
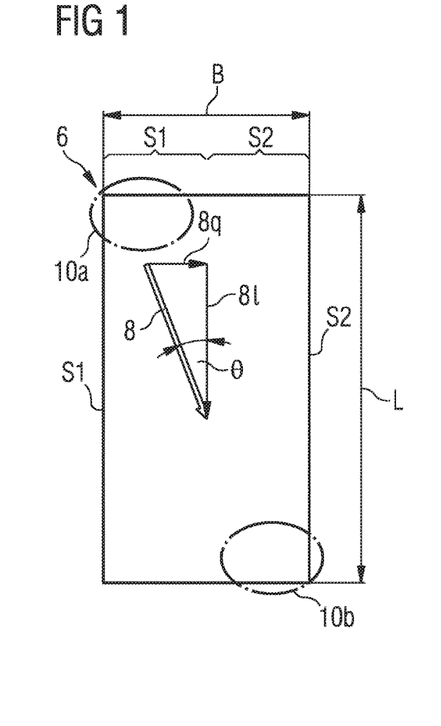
FIG. 1 schematically depicts an inclined conveyor section according to the invention.

FIG. 1 schematically depicts an inclined conveyor section 6 according to the invention, according to one embodiment of the invention. The inclined conveyor section 6 has a first side S1 and a second side S2 that is opposite the first side S1. "Side" S1, S2 here refers not just to the edge of the inclined conveyor section 6, but also to the portion of the inclined conveyor section 6 arranged to the left or right of a center of the inclined conveyor section 6. Parcel goods 4 may be transported to the inclined conveyor section 6 in any transport direction. The inclined conveyor section 6 receives the parcel goods 4 upstream at a first position 10a on the first side S1, transports the parcel goods 4 along the preferred transport direction 8 and discharges them downstream to the conveyor system 2 from the second side S2 at a second point 10b, which is arranged downstream of the first point 10a. Parcel goods 4 may be transported away from the inclined conveyor section 6 in any direction. From the standpoint of the functionality of the inclined conveyor section 6, the direction is not significant in which a conveyor system 2, which comprises the inclined conveyor section 6, conveys the parcel goods 4 before or after the inclined conveyor section 6. The preferred transport direction 8 has a longitudinal component 8l that runs along the sides S1, S2 and a transverse component 8q that runs from the first side S1 to the second side S2. Parcel goods 4 that are introduced into the inclined conveyor section 6 upstream somewhat centrally or on the second side S2, may also be transported only or at least primarily downstream along the longitudinal component 8l; in this case, a lateral barrier of the inclined conveyor section 6, for example in the form of a deflector plate, would be needed to prevent the parcel good 4 from falling down.

The inclined conveyor section 6 has a defined width B and a defined length L. The preferred transport direction 8 defines an angle of inclination θ enclosed by the preferred transport direction 8 and the longitudinal component 8l. With regard to the arrangement of the transport rollers 12, the angle of inclination θ is enclosed by a transport roller axis of rotation and the transverse component 8q of the preferred transport direction 8. The axis of rotation of the transport roller 12 is arranged orthogonally to the preferred direction. The arrangement of a transport roller 12 thus determines its preferred transport direction 8 and thus its angle of inclination θ. The individual transport rollers 12 may, but are not required to, have the same inclined angles θ. An angle of inclination θ=0° corresponds to straight-line transport and is one possible embodiment. The magnitude of the preferred transport direction 8 then corresponds to the longitudinal component 8*l*. At least one of the components length L, width B, angle of inclination θ may be adjusted independently of each other for the inclined conveyor section 6 according to the invention.

Figure 2:
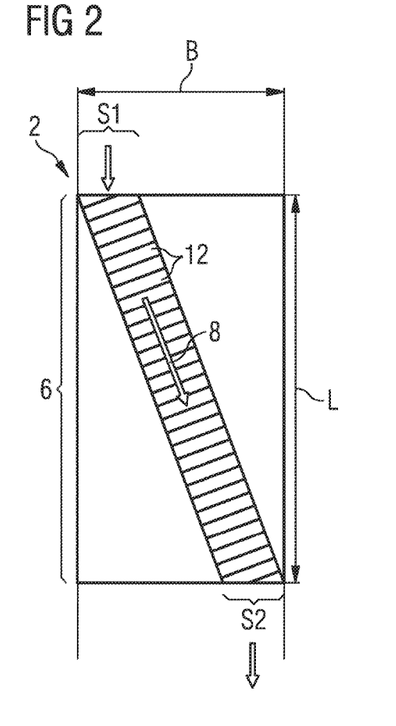
FIG. 2 schematically depicts a conveyor system comprising a typical inclined conveyor section of the prior art.

FIG. 2 shows a conveyor system 2 comprising a typical inclined conveyor section 6 of the prior art, having transport rollers 12. Only one narrow section of the whole inclined conveyor section 6 is available for transport. The length L, width B and angle of inclination θ cannot be adjusted independently of one another. In addition, it is not possible to feed parcel goods onto the inclined conveyor section 6 upstream on the second side S2.

Figure 3:
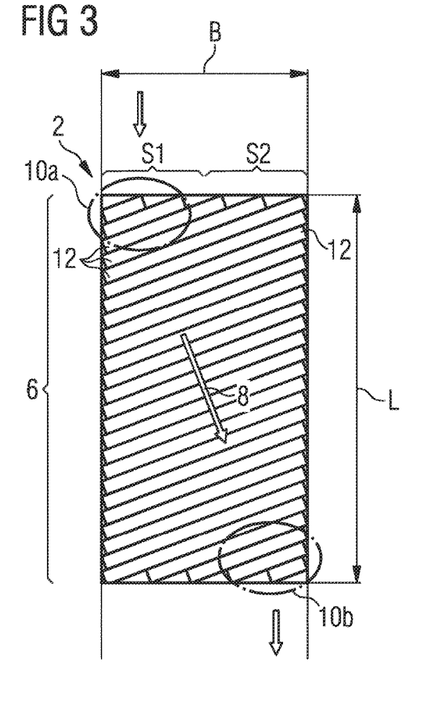
FIG. 3 shows an overhead view of a conveyor system according to the invention.

FIG. 3 shows an overhead view of a conveyor system 2 according to another embodiment of the invention. The inclined conveyor section 6 comprises transport rollers 12 and drive rollers 14 arranged below the transport rollers 12 and not visible in the overhead view of FIG. 3, and is covered by transport rollers 12 over substantially its entire length L and width B, i.e. from the first to the second side S1, S2 and from its beginning upstream to its end downstream. The transport rollers 12 arranged in the area of the first and second positions 10*a*, 10*b* are shorter in length along their axis of rotation than the transport rollers 12 in the center of the inclined conveyor section 6, so as not to project beyond the inclined conveyor section 6. The transport directions of the conveyor system are indicated by arrows in all drawings. The transport rollers 12 may be rotated individually and independently of one another, and may therefore be driven along and/or against the preferred transport direction 8.

Figure 4:
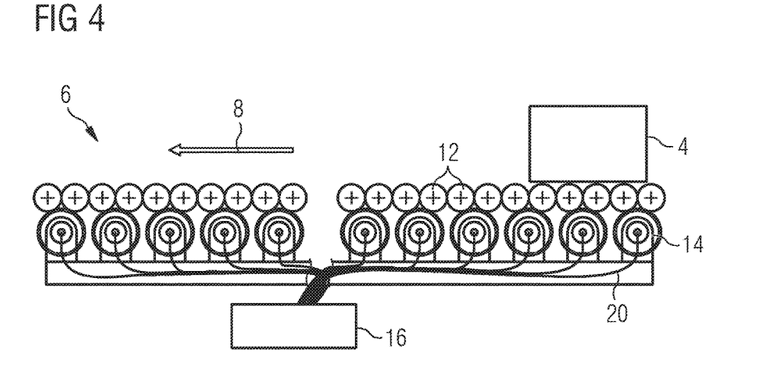
FIG. 4 shows a cross-section through an inclined conveyor section.

FIG. 4 depicts a cross-section through an inclined conveyor section 6 according to one embodiment of the invention. A parcel good 4 is situated on the transport rollers 12 and is transported along the preferred transport direction 8. The drive rollers 14 are positioned below the transport rollers 12 and are connected to a control unit 16 that acts as a supply and control unit. Each drive roller is individually connected to the control unit 16 and is individually supplied, controlled and driven by it. Each drive roller 14 has its own drive, which is configured, for example, as a roller motor.

As a result of this individual drive, separation, acceleration, deceleration and simultaneous lateral transport may be performed together, there is no need for a conveyor section with additional functionality in addition to an inclined conveyor.

The drive rollers 14 that are depicted have about twice the diameter of the transport rollers 12, so the drive rollers 14 may have larger motors and therefore a smaller drive torque may be achieved at a given diameter of the transport rollers 12 and a given conveying speed. In the case of smaller parcel goods 4, typical diameters are about 30 mm for the transport rollers 12 and about 60 mm for the drive rollers 14. In principle, however, the drive rollers 14 may have the same or even a smaller diameter than the transport rollers 12. The drive rollers 14 are respectively pressed upwards into the gap between two transport rollers 12 to ensure efficient torque transmission. The drive roller 14 is in frictional contact with two transport rollers 12, and drives these rollers. Each drive roller 14 may be individually adjusted with regard to its contact pressure and exact positioning. However, it is also possible to adjust several drive rollers together as one segment. This reduces the cost of assembly. It is also possible for one drive roller 14 to drive only one transport roller 12.

According to another embodiment, the drive rollers 14 have about the same diameter as the transport rollers 12. According to a further embodiment, the drive rollers 14 have a smaller diameter than the transport rollers 12.

According to a further embodiment, the drives of the drive rollers 14 consist of roller motors and are connected to the control unit 16, the implementation of which varies according to the application. It is also possible to supply and control the drive rollers 14 by other control and supply systems, in particular drives that have been configured in another way.

Figure 5:
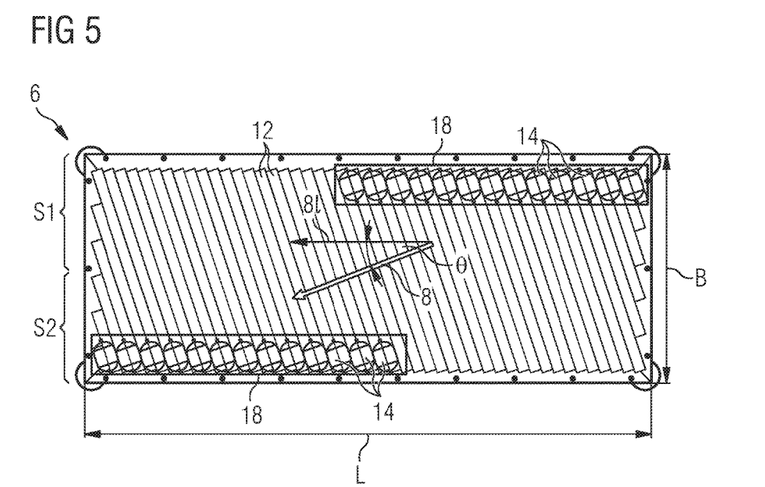
FIG. 5 shows an overhead view of an inclined conveyor section, in which are shown drive roller segments and drive rollers, which however in reality are not visible in this view because they are arranged below the transport rollers.

FIG. 5 shows an overhead view of an additional embodiment of an inclined conveyor section 6 according to the invention. Although the drive rollers 14 are positioned below the transport rollers 12 and therefore are not actually visible, for the sake of clarity they are shown in FIGS. 5-8. In this case, the drive rollers 14 are divided into drive segments 18, each of which comprises thirteen drive rollers 14, which are arranged at the outer edge of the first or second side S1, S2. The exact number depends on the desired width B or length L or angle of inclination θ of the inclined conveyor section 6, and also on the diameter of the transport rollers 12 and their distance from each other. Their arrangement at the outer edge is necessary for an angle of inclination θ≠0°, at least for the first and the last drive roller 14, due to the shortness of the first and the last transport roller 12 in the flow direction. At transport roller diameters of about 30 mm, at a width B of 0.8 m in this case, the length L of the inclined conveyor section is 1.80 m, and the width B may be adjusted as required for a given length L based on the desired angle of inclination θ.

Combining drive rollers 14 into drive segments 18 is not necessary for functionality; each individual drive roller 14 may also be arranged in its own position that deviates from the adjacent drive roller 14 with respect to the width B. Alternatively, the drive rollers 14 are combined and arranged in more than two drive segments 18.

The transport rollers 12 are arranged directly one behind the other and rotatably mounted and extend over substantially the entire length L and width B of the inclined conveyor section 6.

Figure 6:
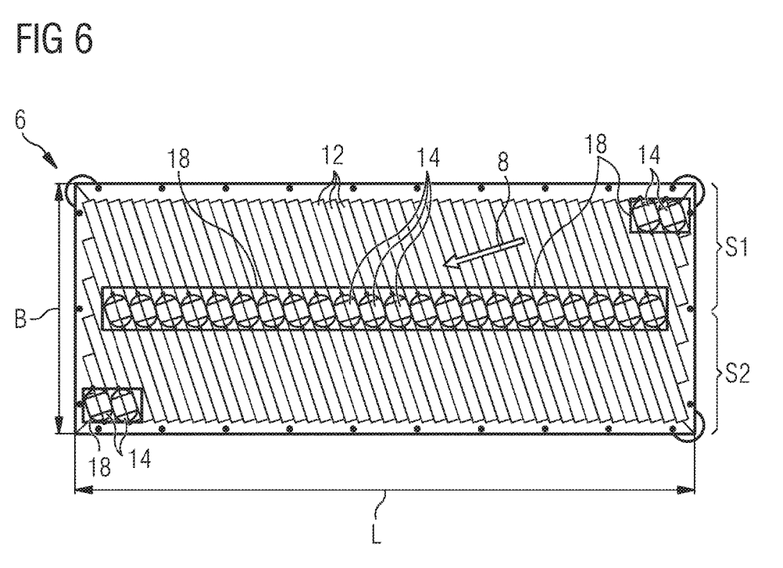
FIG. 6 the same view as in FIG. 5 of an inclined conveyor section, but with three-part drive roller segments.

FIG. 6 shows an additional embodiment of an inclined conveyor section 6 having the same length L and width B as in FIG. 5, but with a different arrangement of the drive segments 18. Two drive rollers 14 are respectively arranged at the outer edge of the first and second side S1, S2, and a drive segment 18 comprising 22 drive rollers 14 is arranged centrally. In general, the drive rollers 14 may be arranged anywhere below the transport rollers 12: in drive segments 18 either individually or as a plurality, in a line behind one another, or offset.

Figure 7:
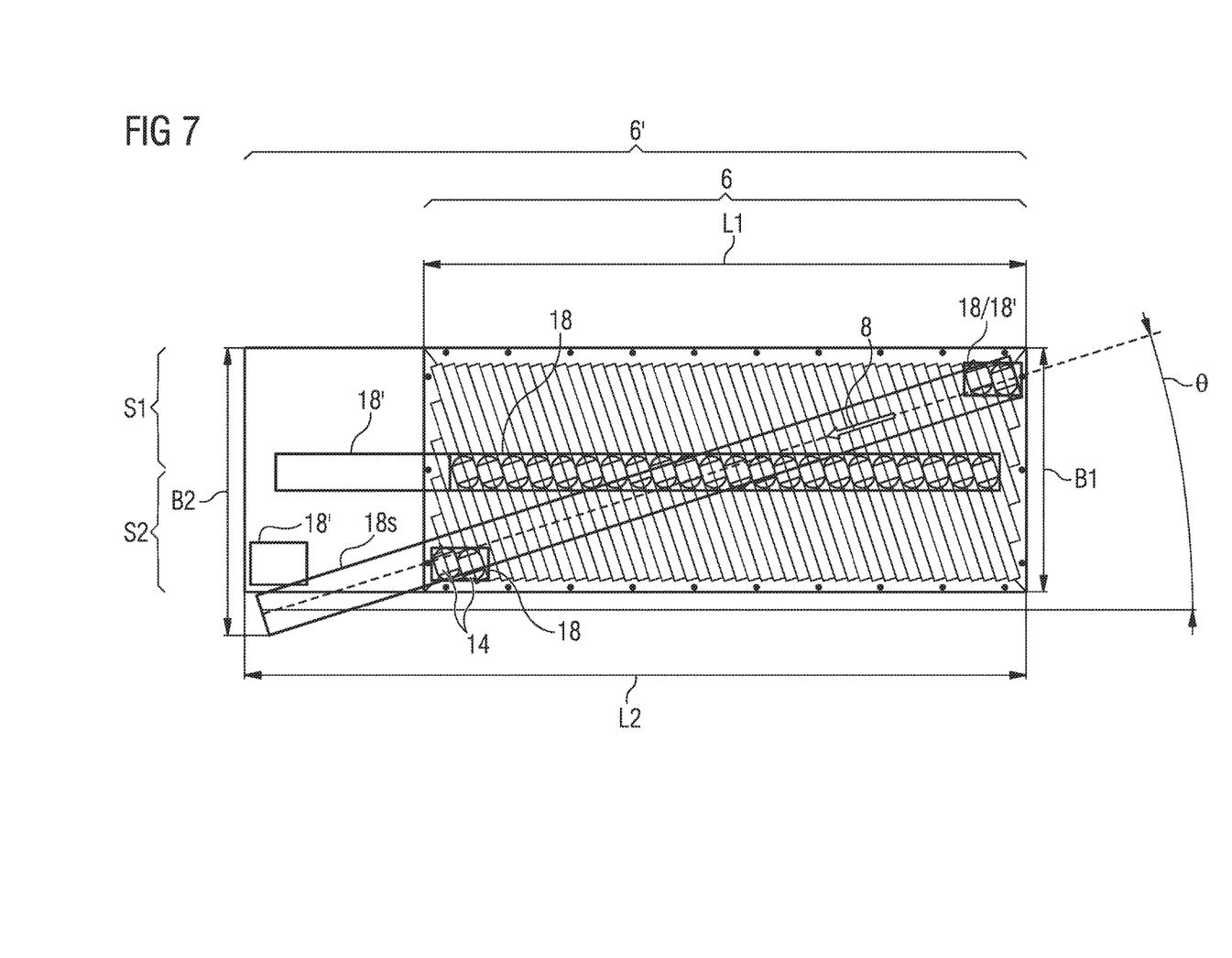
FIGS. 7+8 the same view as in FIGS. 5 and 6 of an inclined conveyor section, in order to illustrate the solution according to the invention as compared to the prior art.
Figure 8:
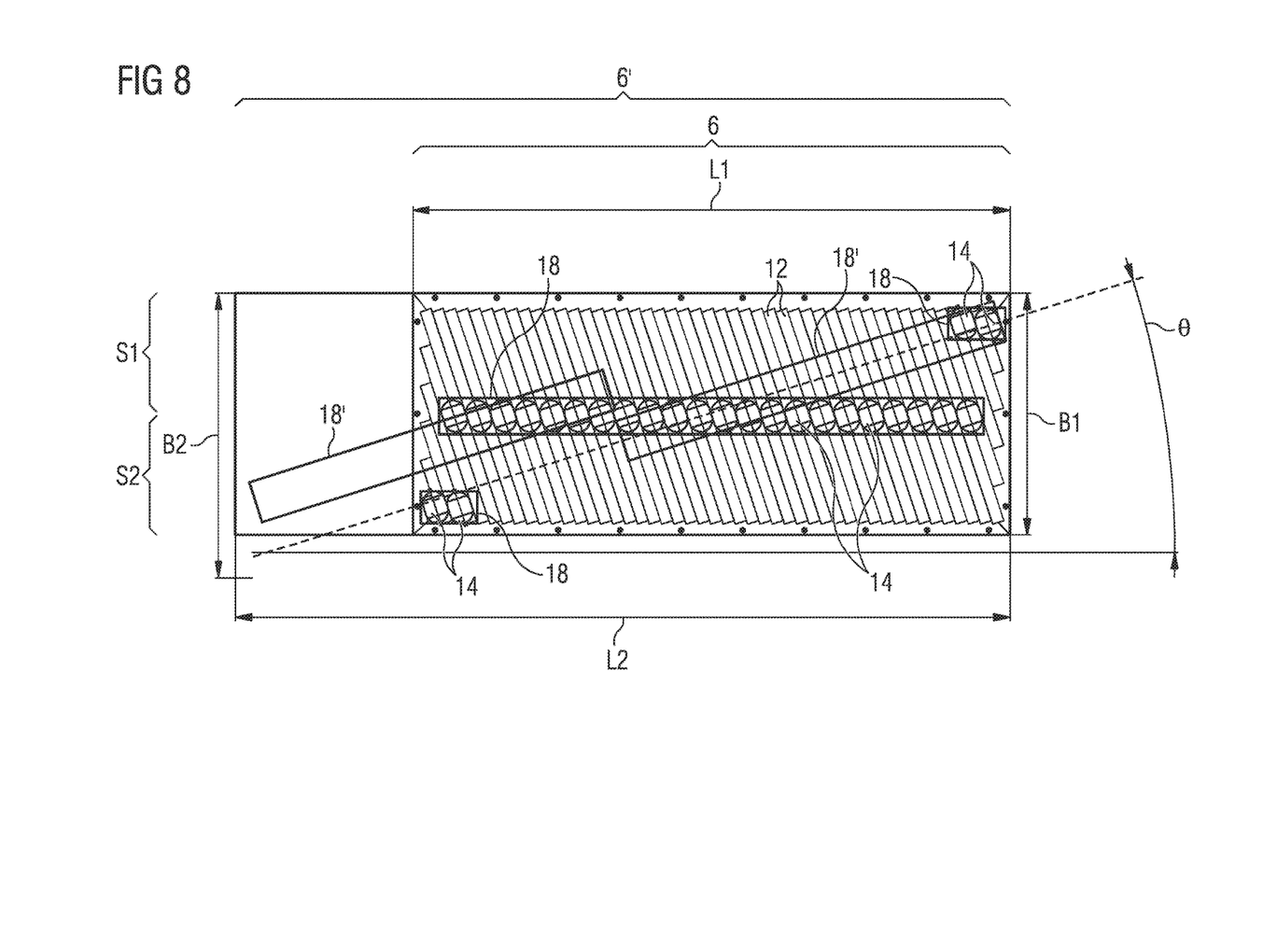

FIGS. 7 and 8 illustrate the variation in the length of the inclined conveyor section 6 over the prior art, which is made possible by the variability in how the drive rollers 14 are arranged, to the extent of a new, lengthened inclined conveyor section 6'. In the case of an inclined conveyor of the prior art, the drive segment 18*s* is not divisible. In the prior art, both the length L and the width B must always be changed at a constant angle of inclination θ. If the length of an inclined conveyor section 6 is to be increased from L1 to L2, in the case of conventional inclined conveyors, the width B must also be adjusted from B1 to B2 at a given angle of inclination θ. However, with an inclined conveyor section 6 according to the invention, it is possible to adjust only the length L from L1 to L2, while keeping the width B1 constant and maintaining the inclined conveyor section 6'. If the angle of inclination θ is constant, given a constant width B1 and angle of inclination θ, the length L may be adjusted freely.

FIG. 7 shows one possible arrangement of the drive segments 18, based on the inclined conveyor section 6 of FIG. 6. The drive segment 18 originally positioned at the end and on the second side S2 of the inclined conveyor section 6 is further displaced in the flow direction so that the drive segment 18' is now arranged at the end of the lengthened inclined conveyor section 6'. The middle drive segment 18' was simply lengthened.

FIG. 8 shows another possibility of division, a central division of the drive segment 18'.

Of course, given a constant length L and a constant angle of inclination θ, it is also possible to adjust the width B to any value. And of course, given a constant length L and constant width B, the angle of inclination θ may be adapted freely. This allows enormous flexibility in the size configuration of the inclined conveyor section 6, which thus may be individually adapted to a great number of conveyor systems 2. Given a predetermined context of length L and width B for the inclined conveyor section 6, the angle of inclination θ may be set to any value.

In all embodiments, a mechanical connection between the transport rollers 12 is not required, which allows uncomplicated assembly and mounting. The drive rollers 14 are in direct and/or indirect contact with the transport rollers 12. It is possible to position a drivable friction belt between the transport rollers 12 and the drive rollers 14, with both the transport rollers 12 and the drive rollers 14 touching the belt, and the drive rollers 14 driving the belt.

Because each drive roller 14 may be controlled at its own individual speed, the inclined conveyor section 6 may also be used to optimize the distance between the parcel goods 4, so that the inclined conveyor section 6 has this additional functionality in addition to lateral conveying.

LIST OF REFERENCE SIGNS

2 Conveyor system
4 Parcel goods
6 Inclined conveyor section
8 Preferred transport direction
8*l* Longitudinal component of preferred transport direction 8
8*q* Transverse component of preferred transport direction 8
10*a* First position
10*b* Second position
12 Transport roller
14 Drive roller
16 Control unit
18 Drive segment
20 Connection between control unit 16 and drive roller 14
B Width of the inclined conveyor section 6
L Length of the inclined conveyor section 6
S1 First side of the inclined conveyor section 6
S2 Second side of the inclined conveyor section 6
θ Angle of inclination

The invention claimed is:

1. A conveyor system for transporting parcel goods, the conveyor system comprising:
 a) an inclined conveyor section having mutually opposite first and second sides;
 b) said inclined conveyor section having a preferred transport direction including a longitudinal component oriented along said sides and a transverse component oriented from said first side to said second side;
 c) said inclined conveyor section including a first position disposed on said first side and a second position disposed downstream of said first position on said second side, said inclined conveyor section being configured to receive the parcel goods upstream at said first position, to transport the parcel goods along said preferred transport direction, and to discharge the parcel goods downstream from said second side at said second position;
 d) said inclined conveyor section including transport rollers and drive rollers;
 e) said transport rollers being disposed one behind another and being rotatable;
 f) said drive rollers being controllable, drivable and disposed below said transport rollers, said drive rollers driving said transport rollers through frictional contact; and
 g) said transport rollers having a preferred transport direction and being aligned obliquely on said inclined conveyor section causing said preferred transport direction of said inclined conveyor section to coincide with said preferred transport direction of said transport rollers.

2. The conveyor system according to claim 1, wherein said drive rollers are individually controllable and drivable.

3. The conveyor system according to claim 1, which further comprises drives each driving a respective one of said drive rollers.

4. The conveyor system according to claim 3, wherein said drives are roller motors.

5. The conveyor system according to claim 1, wherein said drive rollers and said transport rollers have axes of rotation and lengths taken along said axes of rotation, and said lengths of said drive rollers are shorter than said lengths of said transport rollers.

6. The conveyor system according to claim 1, wherein said drive rollers and said transport rollers have diameters, and said diameters of said drive rollers are at least one of larger than or smaller than or equal to said diameters of said transport rollers.

7. The conveyor system according to claim 1, wherein said drive rollers are at least one of disposed one behind another or offset along said inclined conveyor section.

8. The conveyor system according to claim 1, wherein each of said drive rollers is in frictional contact with a respective two of said transport rollers.

9. The conveyor system according to claim 1, which further comprises a control unit configured for individually controlling said drive rollers.

10. The conveyor system according to claim 1, wherein substantially an entire length and width of said inclined conveyor section are covered by said transport rollers.

11. A method for transporting parcel goods on an inclined conveyor section of a conveyor system, the method comprising the following steps:
 providing the inclined conveyor section with first and second mutually opposite sides;
 providing the inclined conveyor section with a preferred transport direction having a longitudinal component along the sides and a transverse component from the first side to the second side;
 providing the inclined conveyor section with transport rollers and drive rollers;
 placing the transport rollers one behind another and rotatably mounting the transport rollers;

controlling the drive rollers, driving the drive rollers, placing the drive rollers below the transport rollers and using the drive rollers to drive the transport rollers by frictional contact;

aligning the transport rollers obliquely on the inclined conveyor section causing the preferred transport direction of the inclined conveyor section to coincide with a preferred transport direction of the transport rollers;

receiving parcel goods upstream at a first position of the inclined conveyor section on the first side;

transporting the parcel goods along the preferred transport direction on the inclined conveyor section; and discharging the parcel goods downstream from the second side at a second position of the inclined conveyor section disposed downstream of the first position.

12. The method according to claim 11, which further comprises individually controlling and driving the drive rollers at different speeds.

13. The method according to claim 11, which further comprises using one drive roller to drive two transport rollers.

14. The method according to claim 11, which further comprises placing the drive rollers at least one of one behind another or offset along the inclined conveyor section.

15. The method according to claim 11, which further comprises:

transporting the parcel goods in a freely selectable transport direction before receiving the parcel goods at the inclined conveyor section; and transporting the parcel goods in a freely selectable transport direction after discharging the parcel goods from the inclined conveyor section.

* * * * *